(12) United States Patent
Scoggins et al.

(10) Patent No.: US 8,627,514 B1
(45) Date of Patent: Jan. 14, 2014

(54) VEHICLE READY MODULAR LIGHT WEIGHT LOAD BEARING EQUIPMENT APPARATUS

(71) Applicant: Spartan Tactical Concepts, LLC, Edmond, OK (US)

(72) Inventors: Phillip R. Scoggins, Edmond, OK (US); Steven E. Scoggins, Edmond, OK (US)

(73) Assignee: Spartan Tactical Concepts, LLC, Edmond, OK (US)

( * ) Notice: Subject to any disclaimer, the term of this patent is extended or adjusted under 35 U.S.C. 154(b) by 0 days.

(21) Appl. No.: 13/892,394

(22) Filed: May 13, 2013

Related U.S. Application Data

(63) Continuation-in-part of application No. 12/052,613, filed on Mar. 20, 2008, now Pat. No. 8,438,811.

(60) Provisional application No. 60/919,726, filed on Mar. 23, 2007.

(51) Int. Cl.
 *A41D 1/02* (2006.01)

(52) U.S. Cl.
 USPC .................................................. 2/102; 2/2.5

(58) Field of Classification Search
 USPC ..................... 52/506.05; 2/102, 2.5, 462, 463
 See application file for complete search history.

(56) References Cited

U.S. PATENT DOCUMENTS

| | | | |
|---|---|---|---|
| 4,864,656 A | 9/1989 | Nesse | |
| 5,060,314 A | 10/1991 | Lewis | |
| 5,265,782 A | 11/1993 | McNamara | |
| 5,544,313 A * | 8/1996 | Shachnai et al. | 725/92 |
| 5,617,582 A | 4/1997 | Burwell | |
| 5,678,882 A | 10/1997 | Hammond | |
| 5,771,489 A | 6/1998 | Snedeker | |
| 5,799,329 A | 9/1998 | Hauschild | |
| 5,806,906 A | 9/1998 | Hammond | |
| 5,926,842 A | 7/1999 | Price et al. | |
| 5,970,513 A | 10/1999 | Kocher | |
| 6,029,270 A | 2/2000 | Ost et al. | |
| 6,108,816 A * | 8/2000 | Bradley | 2/102 |
| 6,131,198 A | 10/2000 | Westrick | |
| 6,151,710 A | 11/2000 | Bachner, Jr. | |
| 6,185,738 B1 | 2/2001 | Sidebottom | |
| 6,266,819 B1 | 7/2001 | Bachner, Jr. | |
| 6,314,578 B1 | 11/2001 | Masuda et al. | |
| 6,419,132 B1 | 7/2002 | Reed et al. | |
| 6,516,981 B2 * | 2/2003 | Perez et al. | 224/148.6 |
| 6,698,024 B2 | 3/2004 | Graves et al. | |
| 7,047,570 B2 | 5/2006 | Johnson | |
| 7,076,806 B1 | 7/2006 | Van Winkle et al. | |
| D528,784 S | 9/2006 | Beck | |

(Continued)

*Primary Examiner* — Mark Wendell
(74) *Attorney, Agent, or Firm* — Hall Estill Attorneys at Law; Daniel P. Dooley

(57) ABSTRACT

Preferably, a vehicle ready modular light weight load bearing equipment apparatus "V-MOLLE," includes a semi-rigid panel portion that includes a front side surface and a backside surface. In a preferred embodiment the front side surface includes a plurality of attachment points configured for reception of a number of utility pouches. The apparatus further preferably includes a vertical anchor system secured to the panel portion and configured for communication with a seat of a vehicle, and a horizontal anchor system secured to the panel portion and configured for communication with the seat of the vehicle. Additionally, the apparatus includes a cover portion attachable to a backside surface of the panel portion, wherein the backside surface of the panel portion is exposable to reveal a signal panel when the cover portion is detached from the panel portion.

20 Claims, 7 Drawing Sheets

(56) References Cited

U.S. PATENT DOCUMENTS

| | | |
|---|---|---|
| 7,243,376 B2 | 7/2007 | Johnson |
| 7,252,259 B2 | 8/2007 | Kovacevich et al. |
| 7,266,850 B1 | 9/2007 | Strum et al. |
| 7,654,426 B2 | 2/2010 | Eberle |
| 7,703,150 B2 | 4/2010 | Wagner et al. |
| 7,707,652 B2 * | 5/2010 | Senegal ............................ 2/102 |
| 7,712,148 B2 | 5/2010 | Carlson |
| 7,945,975 B2 | 5/2011 | Thomas et al. |
| 7,987,523 B2 | 8/2011 | Cole et al. |
| 8,066,161 B2 * | 11/2011 | Green et al. .................. 224/157 |
| 2005/0285436 A1 | 12/2005 | Le Gette et al. |
| 2006/0170173 A1 | 8/2006 | Darling, III |
| 2009/0084821 A1 | 4/2009 | Lenzi |

* cited by examiner

VEHICLE READY MODULAR LIGHT WEIGHT LOAD BEARING EQUIPMENT APPARATUS

RELATED APPLICATIONS

The present application is a continuation-in-part of U.S. patent application Ser. No. 12/052,613 filed on Mar. 20, 2008, which in turn claims priority to U.S. Provisional Application No. 60/919,726 filed Mar. 23, 2007, entitled "Vehicle Ready Modular Light Weight Load Bearing Equipment Apparatus."

FIELD OF THE INVENTION

The claimed invention relates to the field of modular tactical gear; more particularly, but not by way of limitation, to a vehicle ready modular light weight load bearing apparatus ("V-MOLLE").

BACKGROUND

Reducing exposure risks of both field operatives and civilians during military and law enforcement procedures is a continuing objective within the law enforcement and military arenas.

Historically, equipment needed for use in a combative environment such as a combat zone or a riot has been carried by hand. The plethora of combat equipment often requires the loading of a transportation method with volatile ordinances that cannot be adequately restrained. The lack of proper restraint of a volatile ordinance creates potentially deadly hazards for the personnel on any transportation method. Therefore, the safety of loosely securing combat equipment is severely diminished without an apparatus to restrain the volatile ordinances in a position that reduces inadvertent discharge of firearms and weaponry.

Similarly, the efficiency of unloading a large amount of equipment and supplies in a combative environment is hampered without an apparatus to which equipment can be secured. In the past, equipment necessary in the field would need to be secured to the body of person exiting a transportation method. The securement of numerous amounts of field supplies and equipment diminishes the person's ability to evasively maneuver or act in a hostile situation like the ones encountered in combat environments. An apparatus that secures a large amount of equipment and supplies that can be removed from a transportation method and carried in one hand greatly increases the person's ability to take evasive measures necessary for protection in a combat environment.

By reducing the risk of inadvertent discharge of firearms and weaponry during the transport of personnel to operational sites, the safety of civilians along with the safety and efficiency of the field operatives is enhanced.

Accordingly, there is a continuing need for improved devices and procedures for the organization and stowing of field gear within personnel transport vehicles.

SUMMARY OF THE INVENTION

In accordance with preferred embodiments, an apparatus is provided with a panel portion having a semi rigid core and providing a plurality of attachment points configured for reception of a utility pouch. The apparatus further includes a vertical anchor system secured to the panel portion and configured for communication with a seat of a vehicle, and a horizontal anchor system secured to the panel portion and configured for communication with the seat of the vehicle. Additionally, the apparatus includes a cover portion attachable to a backside surface of the panel portion, wherein the backside surface of the panel portion is exposable to reveal a signal panel when the cover portion is detached from the panel portion.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
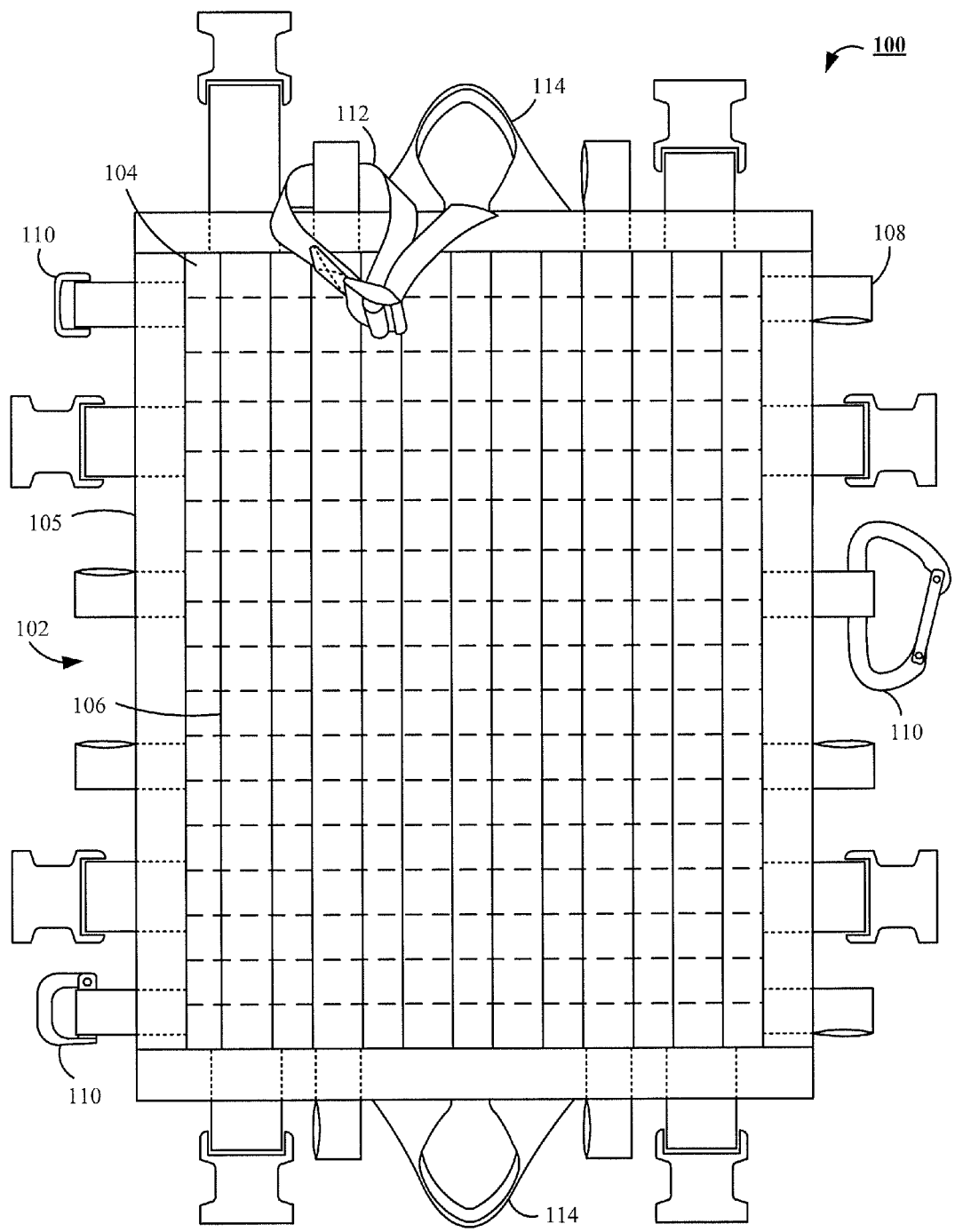
FIG. 1 is a top plan view of a vehicle ready modular light weight load bearing equipment apparatus "V-MOLLE" of the present invention showing a panel portion of the V-MOLLE.

Referring to the drawings, FIG. 1 shows a vehicle ready modular light weight load bearing equipment apparatus "V-MOLLE," 100, includes a semi-rigid panel portion 102 that includes a front side surface 104, and a reinforced boarder portion 105 enclosing the panel portion. In a preferred embodiment the front side surface 104 includes a plurality of attachment points 106 configured for reception of a number of utility pouches (such as 140 of FIG. 4). The perimeter of the semi-rigid panel portion 102 preferably provides a plurality of attachment loops 108, in which each attachment loop provides an attachment for gear restraints 110. The gear restraints 110 are available in a number of configurations that include, but are not limited to, D-rings, utility straps, bungee cords (available from the "The Original Bungee Company" of Harbor City, Calif.), elastic straps, carabiner clips, and grimloc carabiners. The perimeter of the V-MOLLE 100 preferably further includes an anchor point providing an adjustable restraint 112 configured for securement of an elongated device such as a weapon (such as 148 of FIG. 6). Further included in a preferred embodiment, a pair of handholds 114 affixed to the V-MOLLE on opposite sides of the semi-rigid panel portion 102.

Figure 2:
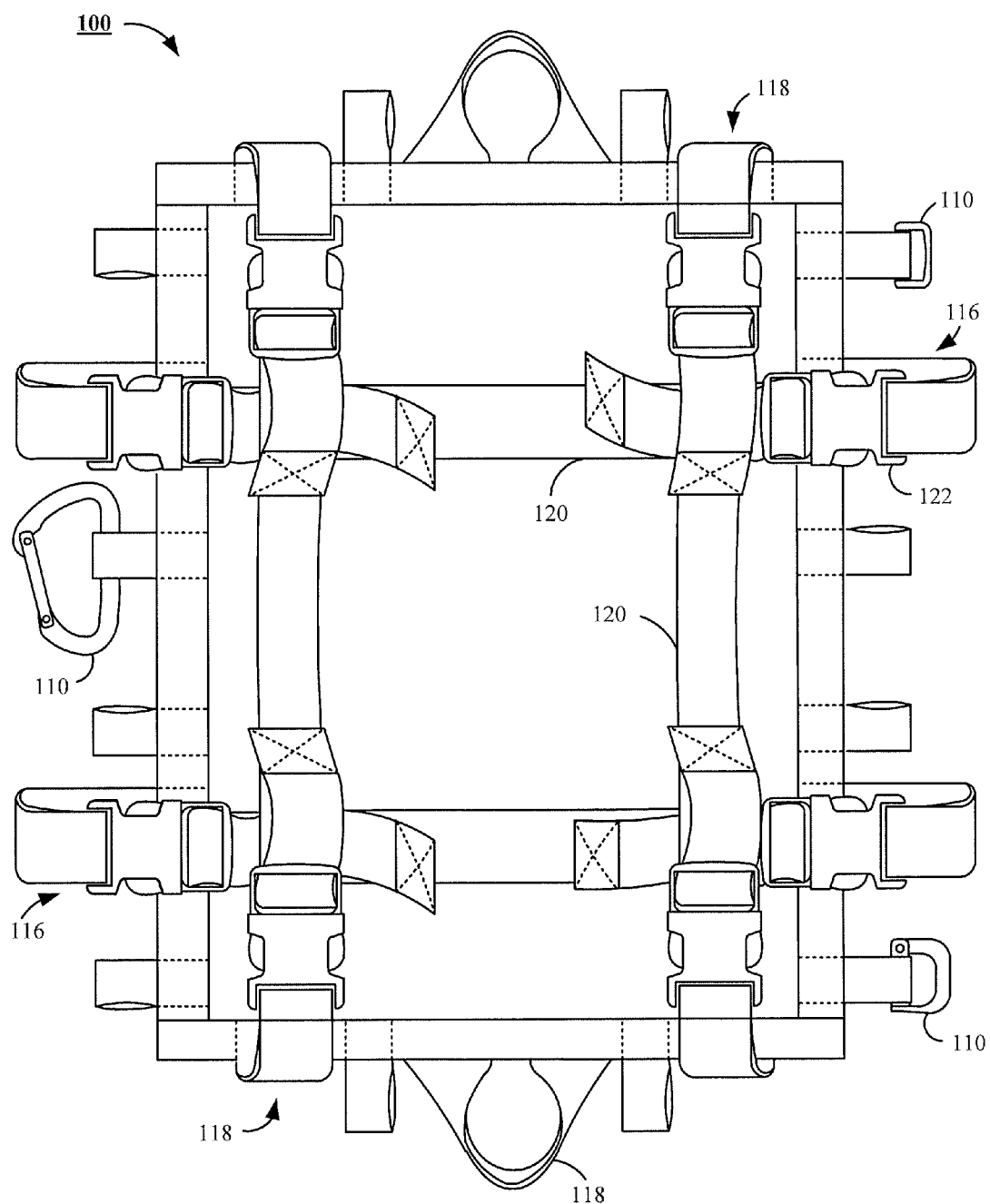
FIG. 2 is a top plan view of a cover portion covering a backside surface of the panel portion of the V-MOLLE of FIG. 1.
Figure 6:
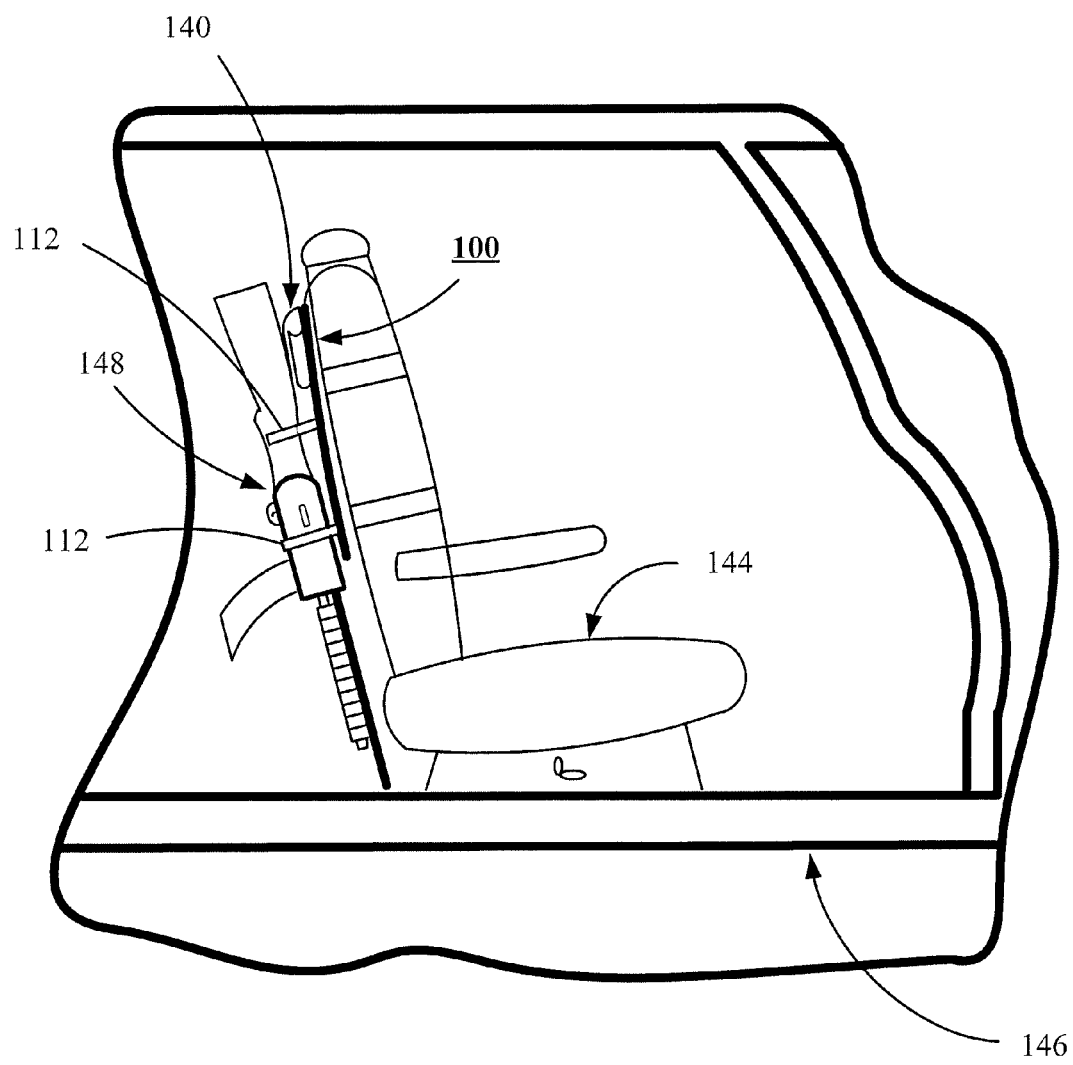
FIG. 6 is a side elevation view of the V-MOLLE of FIG. 1 secured to a seat of a vehicle showing a weapon lashed in place.
Figure 7:
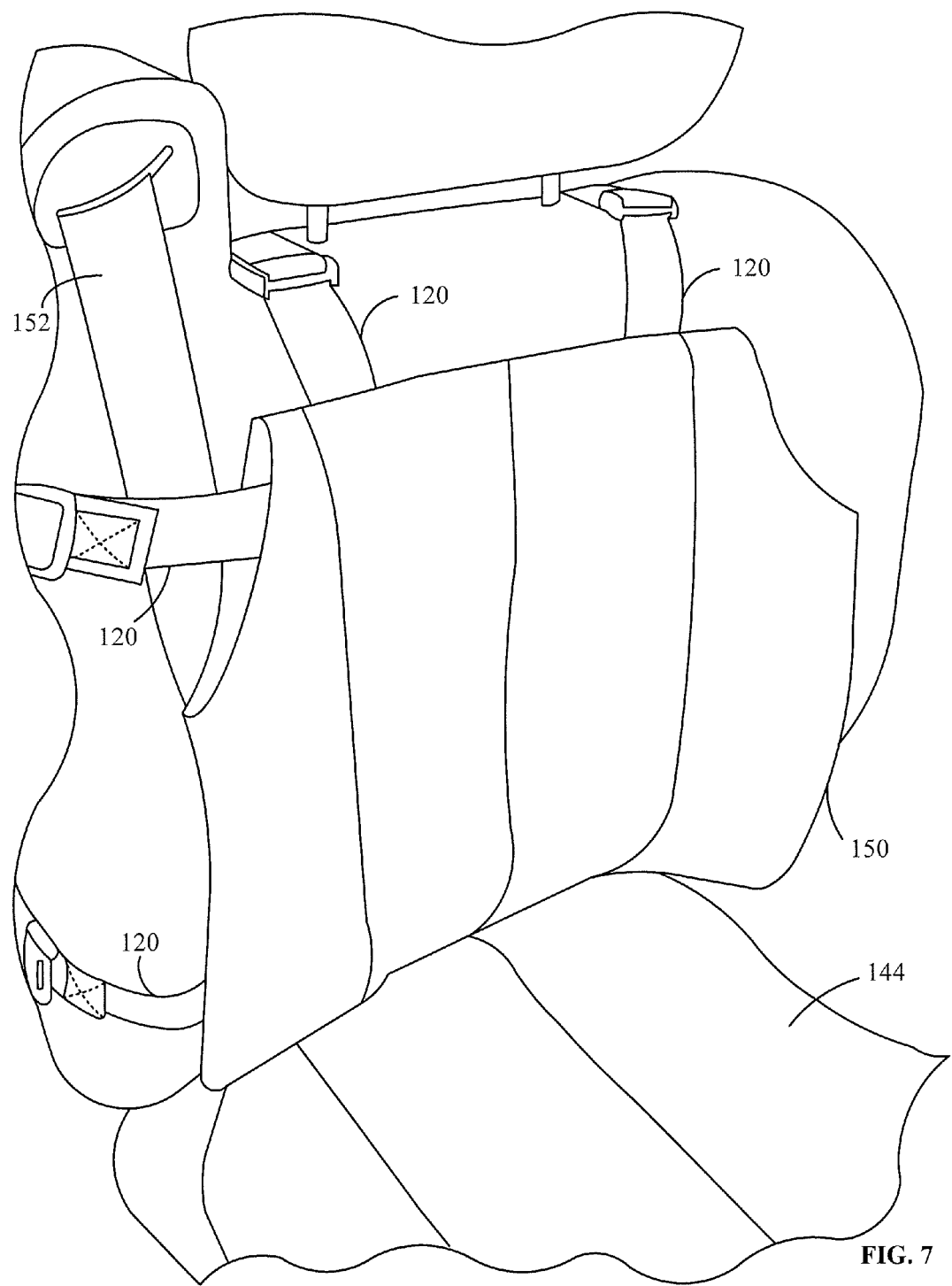
FIG. 7 is a perspective view of a web portion of the V-MOLLE of FIG. 1. The web portion minimizes strap entanglement with gear carried by personnel.

FIG. 2 shows the V-MOLLE provides a pair of horizontal anchor systems 116, and a pair of vertical anchor systems 118. Preferably, the vertical and horizontal anchor systems 116, 118 work in conjunction to secure the V-MOLLE 100 to a seat of a vehicle (such as shown by FIGS. 6 & 7). In a preferred embodiment of the present invention, the V-MOLLE 100 further includes a pair of handholds 114 secured to the perimeter of the semi-rigid panel portion 102, and each anchor system 116, 118 provides a securement strap 120 and a releasable attachment device 122. The attachment loops 108 that preferably surround the semi-rigid panel 102 can be selectively be equipped with gear restraints 110 such as quickdraws, carabiners, and clips.

Figure 3:
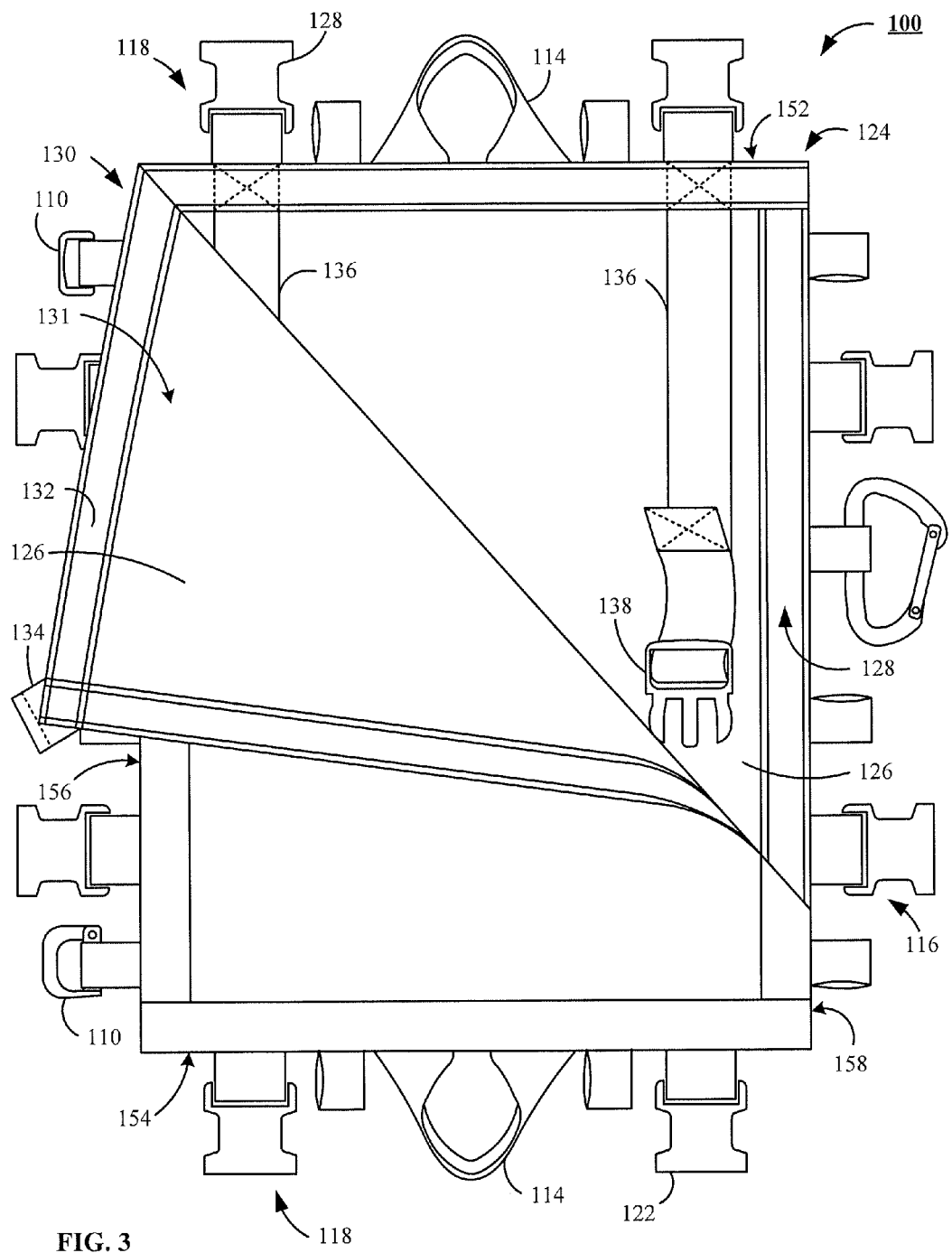
FIG. 3 is a bottom plan view of the panel portion of the V-MOLLE showing a signal surface supported by the panel portion.

FIG. 3 shows the V-MOLLE 100 preferably includes a backside portion 124 that features a signal surface 126 and a cover attachment means 128, such as Velcro®, which is used to secure a cover portion 130. The cover portion 130 preferably provides a mating attachment means 132, which communicates with the cover attachment means 128 to secure the cover portion 130 adjacent the backside portion 128 of the V-MOLLE 100, until pressure is applied to the release tab 134 to release the cover portion 130 from the backside portion 124 to expose the signal surface 126. Further in a preferred embodiment, a backside portion 131 of the cover portion 130 provides a support for the extension of the signal surface 126 onto the backside portion 131 of the cover portion. Preferably, the signal surface is provided in a color associated with emergency or signals, such as "emergency orange." Additionally, the V-MOLLE 100 preferably includes a shoulder strap 136 formed from a flexible material, and supporting a quick release restraint buckle 138. During field operations an operative would typically carry the V-MOLLE 100 to a selected position in support of an operation via the handholds 114, to save time in deploying to and setting up at the selected position, however at the conclusion of the operation the operative may wish to transport the V-MOLLE 100 back to the vehicle as one would carry a backpack.

Figure 4:
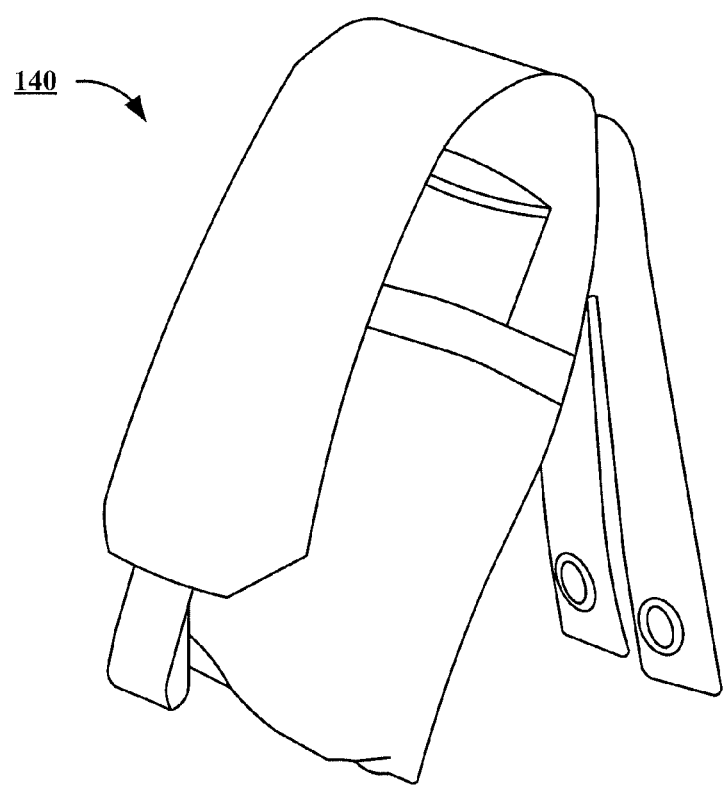
FIG. 4 is a perspective view of a utility pouch configured to communicate with a front side of the panel portion of the V-MOLLE of FIG. 1.
Figure 5:
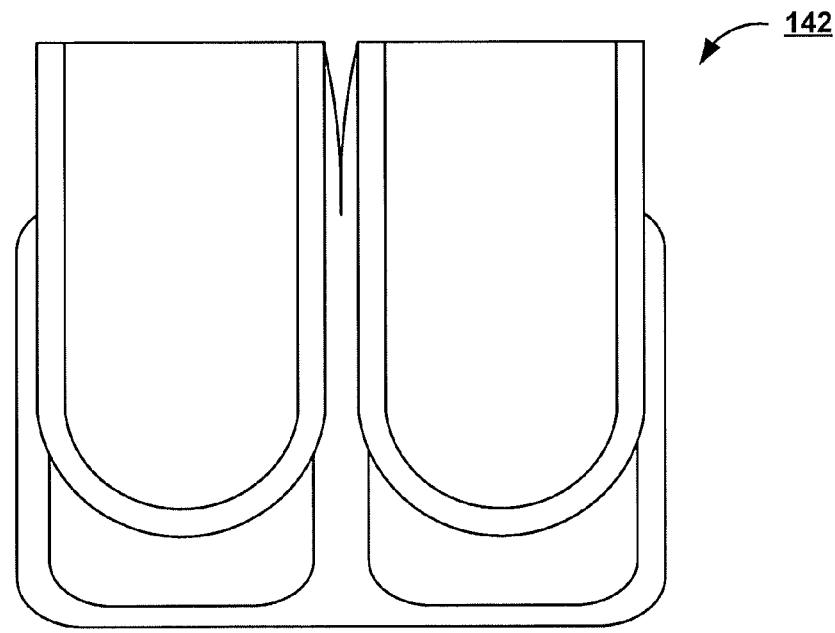
FIG. 5 is a top plan view of a utility pouch capable of communicating with a front side of the panel portion of the V-MOLLE of FIG. 1.

FIG. 4 shows a typical utility pouch 140 configured for communication with at least one of the attachment points 106. Likewise, the attachment points 106 can receive a variety of utility pouches that include multiple securement areas such as a dual utility pouch 142 depicted in FIG. 5. As illustrated by FIG. 6, the V-MOLLE 100 mounted to a seat 144 of a means for transportation 146. It will be understood that the means for transportation 146 could be any watercraft, aircraft, or land vehicle weather military or civilian, and that the V-MOLLE 100 is adaptable for securement to the exterior of the means for transportation 146 as well as the interior. It is further noted that a seat, such as seat 144, is not required for mounting the V-MOLLE 100 to the means for transportation 146, any portion of the means for transportation 146 accessible to attachment capabilities of the V-MOLLE 100 is acceptable for securement of the V-MOLLE 100 to the means for transportation 146.

FIG. 6 further shows a utility pouch such as 140 or 142 attached to the attachment points 106 and a weapon 148 lashed by a first anchor point providing an adjustable restraint 112 and a second anchor point providing an adjustable restraint 112, thereby securing the weapon 148 during transport of personnel to operational sites.

FIG. 7 shows a web portion 150 of the V-MOLLE of FIG. 1. The web portions 150, minimizes strap entanglement between the securement straps 120 (of FIG. 2) themselves as well as with equipment and clothing carried and worn by personnel.

Figure 8:
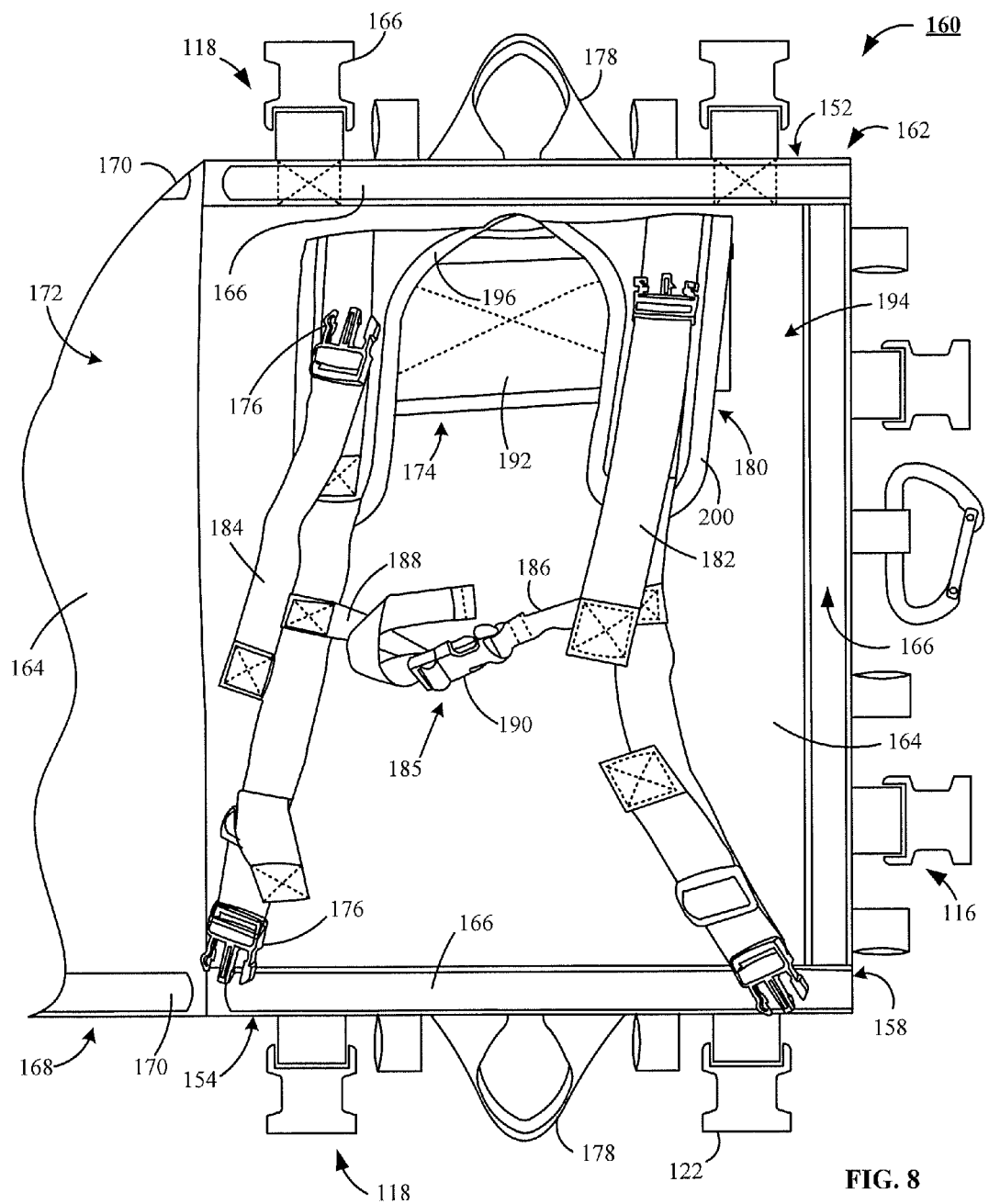
FIG. 8 is a bottom plan view of an alternate embodiment of the panel portion of the V-MOLLE showing a signal surface supported by the panel portion and supporting a harness.

FIG. 8 shows an alternate embodiment of a V-MOLLE 160, which preferably includes a backside portion 162 that features a signal surface 164 and a cover attachment means 166, such as Velcro®, which is used to secure a cover portion 168. The cover portion 168 preferably provides a mating attachment means 170, which communicates with the cover attachment means 166 to secure the cover portion 168 adjacent the backside portion 162 of the V-MOLLE 160, until pressure is applied to a release tab, such as 134 of FIG. 3, to release the cover portion 168 from the backside portion 162 to expose the signal surface 164. Further in a preferred embodiment, a backside portion 172 of the cover portion 168 provides a support for the extension of the signal surface 164 onto the backside portion 172 of the cover portion. Preferably, the signal surface is provided in a color associated with emergency or signals, such as "emergency orange." Preferably, the V-MOLLE 160 further includes a harness 174 formed from a flexible material, and supporting a quick release restraint buckle 176. During field operations, an operative would typically carry the V-MOLLE 160 to a selected position in support of an operation via the handholds 178, to save time in deploying to and setting up at the selected position, however at the conclusion of the operation the operative may wish to transport the V-MOLLE 160 back to the vehicle utilizing the harness 174 as one would carry a backpack.

In a preferred embodiment, the harness 174 includes at least a shoulder yoke 180, a first cinch 182, a second cinch 184, and a cinch restraint assembly 185. In a preferred embodiment, the cinch restraint assembly 185, includes at least a first restraint member 186 secured to the first cinch 182, a second restraint member 188 secured to the second cinch 184, and a fastening device 190, interacting with each the first and second restraint members (186, 188). And the shoulder yoke 180, includes at least a back panel 192 secured to a back side surface 194 of the panel portion 102 (of FIG. 1), a collar portion 196 extending from the back panel 192, a first extension 198 cooperating with the collar portion 196 and extending from the back panel 192, and a second extension 200 cooperating with the collar portion 196 and extending from the back panel 192.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed.

What is claimed is:

1. An apparatus comprising:
   means for mechanical transportation;
   a vertical anchor system secured to said means for mechanical transportation;
   a panel portion providing a plurality of attachment points, said panel portion secured to said vertical anchor system, said attachment points communicating with a utility pouch;
   a horizontal anchor system secured to said panel portion and communicating with said means for mechanical transportation;
   a cover portion attached to a backside surface of said panel portion, said backside surface of said panel portion exposed when said cover portion is detached from said panel portion; and
   a harness disposed between said cover portion and said backside surface of said panel portion, said harness providing at least a shoulder yoke secured to said backside surface, and a cinch communicating with each the shoulder yoke and a lower portion of the vertical anchor system, the shoulder yoke disposed between the cinch and shoulders of an individual.

2. The apparatus of claim 1, in which said means for mechanical transportation is selected from a group consisting of watercraft, aircraft, and land vehicles.

3. The apparatus of claim 2, in which said cinch of said harness is a first cinch, said harness further comprising:
   a second cinch; and
   a cinch restraint assembly cooperating with each first and second cinches, the cinch restraint assembly including at least a first restraint member cooperating with the first cinch, a second restraint member cooperating with the second cinch, and fastening device interacting with each the first and second restraint members.

4. The apparatus of claim 3, further comprising an attachment loop secured to said panel portion, wherein said attachment loop provides for an attachment of a gear restraint.

5. The apparatus of claim 4, further comprising a handhold secured to said panel portion, and in which the first and second restraint members, when cooperating with the fastening device, determine a distance between said first and second cinches.

6. The apparatus of claim 5, further comprising a web portion independent from and communicating only with each said horizontal and vertical anchor system, and in which each said horizontal and vertical anchor system comprises a securement strap communicating with an attachment device, and in which said backside surface comprises an emergency signal surface, and in which the backside surface of said panel portion extends from a first horizontal edge of said panel portion to a second horizontal edge of the panel portion, and from a first vertical edge of the panel portion to a second vertical edge of the panel portion.

7. The apparatus of claim 6, in which each said horizontal and vertical anchor system comprising a securement strap communicating with an attachment device.

8. The apparatus of claim 7, in which each said attachment loop comprising a non-detachable attachment device, and wherein the panel portion comprises a semi-rigid core.

9. The apparatus of claim 8, in which said elongated device is an assault rifle.

10. The apparatus of claim 9, further comprises a reinforced boarder portion enclosing the panel portion.

11. The apparatus of claim 10, in which the shoulder yoke comprises:
   a back panel secured to the backside surface;
   a collar portion extending from the back panel;
   a first extension cooperating with the collar and extending from the back panel, the first extension disposed between the first cinch and a first shoulder of the individual; and
   a second extension cooperating with the collar and extending from the back panel, the second extension disposed between the second cinch and a second shoulder of the individual.

12. The apparatus of claim 11, in which the cinch comprises a strap formed from a flexible material, the strap supporting a quick release restraint buckle.

13. The apparatus of claim 12, in which the emergency signal surface extends over a backside portion of the cover portion.

14. The apparatus of claim 13, in which the emergency signal surface is presented in an emergency orange color.

15. The apparatus of claim 14, in which the gear restraint comprises a carabiner clip.

16. The apparatus of claim 14, in which the gear restraint comprises a grimloc carabiner.

17. The apparatus of claim 14, in which the gear restraint comprises a D-ring.

18. The apparatus of claim 14, in which the gear restraint comprises a utility strap.

19. The apparatus of claim 14, in which the gear restraint comprises an elastic strap.

20. The apparatus of claim 14, in which the gear restraint comprises a bungee cord.

* * * * *